(12) United States Patent
Fjellstad et al.

(10) Patent No.: US 9,885,794 B2
(45) Date of Patent: Feb. 6, 2018

(54) SYSTEM AND METHOD FOR ACCURATE POSITIONING OF CONTROL DEVICES FOR INSTRUMENTED CABLES

(71) Applicant: Kongsberg Seatex AS, Trondheim (NO)

(72) Inventors: Ola Erik Fjellstad, Trondheim (NO); Per Christian Berntsen, Trondheim (NO)

(73) Assignee: Kongsberg Seatex AS, Trondheim (NO)

( * ) Notice: Subject to any disclaimer, the term of this patent is extended or adjusted under 35 U.S.C. 154(b) by 87 days.

(21) Appl. No.: 14/787,023

(22) PCT Filed: Apr. 10, 2014

(86) PCT No.: PCT/NO2014/050055
§ 371 (c)(1),
(2) Date: Oct. 26, 2015

(87) PCT Pub. No.: WO2014/175745
PCT Pub. Date: Oct. 30, 2014

(65) Prior Publication Data
US 2016/0103237 A1    Apr. 14, 2016

(30) Foreign Application Priority Data

Apr. 26, 2013 (NO) .................................. 20130577

(51) Int. Cl.
*G01V 1/38* (2006.01)
*G01S 1/78* (2006.01)
*G05D 1/02* (2006.01)

(52) U.S. Cl.
CPC ............ *G01V 1/3808* (2013.01); *G01S 1/786* (2013.01); *G01V 1/3826* (2013.01); *G01V 1/3835* (2013.01); *G05D 1/0208* (2013.01)

(58) Field of Classification Search
CPC .... G01S 1/786; G05D 1/0208; G01V 1/3835; G01V 1/3808; G01V 1/3826
USPC ...................................................... 367/16, 17
See application file for complete search history.

(56) References Cited

U.S. PATENT DOCUMENTS

| 4,532,617 | A | 7/1985 | Baecker et al. |
| 4,669,067 | A | 5/1987 | Roberts |
| 2005/0180263 | A1 | 8/2005 | Lambert et al. |

FOREIGN PATENT DOCUMENTS

| WO | 03100451 A2 | 12/2003 |
| WO | 2011014071 A2 | 2/2011 |

OTHER PUBLICATIONS

International Search Report dated Sep. 3, 2014 (PCT/NO2014/050055).

(Continued)

*Primary Examiner* — Daniel L Murphy
(74) *Attorney, Agent, or Firm* — Alix, Yale & Ristas, LLP.

(57) ABSTRACT

Method and system for high-accurate position determination of control devices arranged in connection with instrumented cables towed behind a survey vessel by at least one autonomous surface vessel provided with acoustic communication means, where the control devices are provided with acoustic elements, and where the acoustic communication means and acoustic elements are used for accurate positioning of the surface vessel above the control device.

21 Claims, 5 Drawing Sheets

(56) References Cited

OTHER PUBLICATIONS

Ferreira, Bruno M. et al., "Localization of a sound source: optimal positioning of sensors carried on autonomous surface vehicles," INESC TEC, Faculty of Engineering, University of Porto, Portugal, 2013.
Zhao, Shiyu et al., "Optimal Sensor Placement for Target Localization and Tracking in 2D and 3D," National University of Singapore, Oct. 28, 2012.

SYSTEM AND METHOD FOR ACCURATE POSITIONING OF CONTROL DEVICES FOR INSTRUMENTED CABLES

BACKGROUND

The disclosure is related to a method for accurate positioning of control devices for instrumented cables.

The disclosure further relates to a system for accurate positioning of control devices for instrumented cables.

The position of instrumented cables in the sea is controlled by control devices which can control the instrumented cables horizontally and vertically based on control signals being sent from a survey vessel via the instrumented cable to each control device, also known as birds. The instrumented cables are towed by a survey vessel and have a control device for each 300 meters along the instrumented cable, which can be up to 5-6 km long. To obtain sufficient data basis to evaluate oil deposits in the ground, usually 10-12 instrumented cables are to be towed in parallel in a spread. Due to varying conditions with regard to currents and salinity in the sea, the position of the instrumented cables can deviate relatively much from the straight line behind the survey vessel which one desire to achieve during the towing. As the quality of the data basis to a large extent are depending on that one know the accurate position of the instrumented cable, it is important to know the position of the instrumented cable with as high accuracy as possible. One way to determine this is by determining the position of the control device as accurately as possible. The position of the instrumented cable is then usually approximated as the straight line between the control devices.

Present known solutions use acoustic triangulation between acoustic transponders arranged in the instrumented cable and work boats or following vessels.

U.S. Pat. Nos. 4,532,617 and 4,669,067 both describe acoustic triangulation methods where following (slave) vessels and acoustic transponders arranged in the instrumented cable are used. The disadvantage with this method is that it results in a high number of transponders and operative personnel, and following vessels which are necessary to perform the operation.

US 2005/0180263 A1 describes a method with GPS receiver on towed following vessel and acoustic means for communication with transponder arranged in the instrumented cable. The disadvantage with this method is that the position deviation caused by currents and wave affection, and that one need a towed GPS unit with transponder for each segment of the instrumented cable to be positioned. A high number of following vessels will make deploying and retrieving of the instrumented cable an extensive, expensive and inexpedient operation.

Another disadvantage with the mentioned solutions is that, as the transponders are arranged in the instrumented cable, they are subjected to leakage in the cable. Further, if an error should arise, the entire cable segment must be exchanged.

Other methods for positioning are by use of compass in the control device and instrumented cable, and the use of accelerometer and velocity meters for estimating the position of the instrumented cable. In addition, floaters or tail buoys are used at the end of the instrumented cable where one can utilize GPS positioning. The position of the tail buoy can then be estimated with high accuracy, but one cannot necessarily use this to estimate the position of the instrumented cable for the distance between the vessel and the tail buoy due to the current conditions in the sea. This method will in best case provide sufficient accuracy for the position of the instrumented cable near the tail buoy.

The mentioned methods have several disadvantages in a practical seismic operation. Accelerometer and compass provides relatively low precision and can only be used for approximate estimation of position.

Acoustic positioning requires extensive use of equipment and manpower in the form of following vessels and has limitations with regard to the range of the acoustic signals.

Another known method is by using a towed surface vessel with GPS positioning. The surface vessel is then connected with the control device by means of towing line and the position of the control device is assumed to be the same as the position of the surface vessel. As the control device is located up to 50 meters under the surface it could however be a considerable deviation in position between the control device and surface vessel due to the current condition and the drag in the line. The surface vessel will in this case only exceptionally be located straight above the control device due to currents and the drag in the line.

Another disadvantage with this method is that it in practice only can be utilized for a low amount of control devices at the time due to each control device must be physically connected with one surface vessel via a line. This increases both the complexity in the operation of deploying and retrieving control devices and introduces noise from the towing which will increase the noise level of the acoustic measurements.

There is accordingly a need for a method and a system for accurate positioning of control devices for instrumented cables solving the weaknesses/disadvantages of prior art, and simplifying the task of accurate positioning of the control devices.

SUMMARY

The disclosure provides a method and system for accurate positioning of control devices for instrumented cables solving the above mentioned problems with prior art.

A method and system further provides positioning of control devices for instrumented cables having a considerably higher accuracy than what can be achieved by prior art.

Also provided herein is a method and system which is able to determine accurate position for all control devices in a seismic spread exclusively by using a surface vessel which autonomously can move from one control device to another.

Additionally provided herein is a redundant communication technique which ensures that positioning data can be transferred to the surface vessel.

Also provided is a system with one surface vessel provided with radio communication and optical signaling so that one easily can communicate with the surface vessel and identify the position by light signals, something which considerably can contribute to simplifying and improving the efficiency of service and maintenance work on control devices in the sea.

Disclosed herein is a method and a system for accurate positioning of control devices in instrumented cables.

The system includes an autonomous surface vessel provided with a Global Positioning System (GPS) for accurate self-positioning and is further provided with an acoustic element for communication with control devices provided with an acoustic element, and possibly other towed elements provided with an acoustic element. The surface vessel is arranged for maintaining accurate position straight above the control device by means of the acoustic element. By this is achieved approximately GPS accuracy at positioning of the control device. The same accuracy as by use of differential GPS, i.e. accuracy in the order of cm to meter, can be achieved.

The autonomous surface vessel is arranged for finding its own position by GPS positioning and optionally differential positioning signals which are sent from the seismic survey vessel or from external correction signals from satellite-based systems. The autonomous surface vessel is further provided with energy supply, control unit, and propulsion means, such as propellers or thrusters, for propulsion in X- and Y-direction.

The autonomous surface vessel is further provided with radio communication capabilities for communication with the seismic surface vessel and possibly work boats and other surface vessels.

The control unit of the surface vessel is provided with a control unit including necessary memory and interface for steering and controlling the surface vessel based on signals from the seismic survey vessel, work boats and/or other units.

The surface vessel is further provided with optical communication capabilities for signaling to other surface units. With optical signaling from the surface vessel operating crew in work boats rapidly can identify the position of the control device and bring this to the surface for possible adjustments or repairs.

The acoustic element in the control device is preferably arranged in the wings of the control device.

A method for high-accurate position determination of control devices arranged in connection with instrumented cables towed behind a survey vessel includes:
  positioning at least one survey vessel in the vicinity of a chosen control device arranged in connection with an instrumented cable via control commands from the survey vessel,
  positioning the surface vessel accurately above the chosen control device via the acoustic element of the control device and surface vessel, respectively, position the surface vessel accurately above the chosen control device.

The method further includes sending directive modulated acoustic signals from the acoustic element of the control device or from the acoustic element of the surface vessel.

The method further includes transmitting two directive modulated acoustic signals with two different frequencies in two different directions.

The method can further include transmitting a third modulated acoustic signal with a third frequency, wherein the third acoustic signal is arranged perpendicularly to the two mentioned acoustic signals.

The method further includes measuring mutual relative strength between the directive modulated acoustic signals with different frequencies and utilize this for positioning the one or more autonomous surface vessels in an accurate position above a control device of interest. Positioning of the surface vessels includes estimating position deviation between control device and surface vessel based on the relative strength between the measured directive modulated acoustic signals and utilize this as control signals for propulsion means for the surface vessel for minimizing the position deviation.

The method further includes determining accurate position for the surface vessel by a global positioning system arranged on the surface vessel. By using differential methods for correcting the signal from the global positioning system one can achieve increased accuracy in the position determination. One can further also use external correction signals from satellite-based systems for increased accuracy.

The method further includes distributing accurate position to survey vessel, work boats and other users of such information. The distribution can be performed through one or more redundant communication channels, such as radio communication, acoustic communication, instrumented cable and/or optical communication.

The method can also include controlling the autonomous surface vessel(s) after a pre-programmed route or to a given position for positioning a numerous control devices.

Further preferable features and advantageous details of the disclosed embodiments will appear from the following detailed description.

BRIEF DESCRIPTION OF THE DRAWINGS

The present invention will below be described in more detail with references to the attached drawings, where.

DETAILED DESCRIPTION

Figure 1:
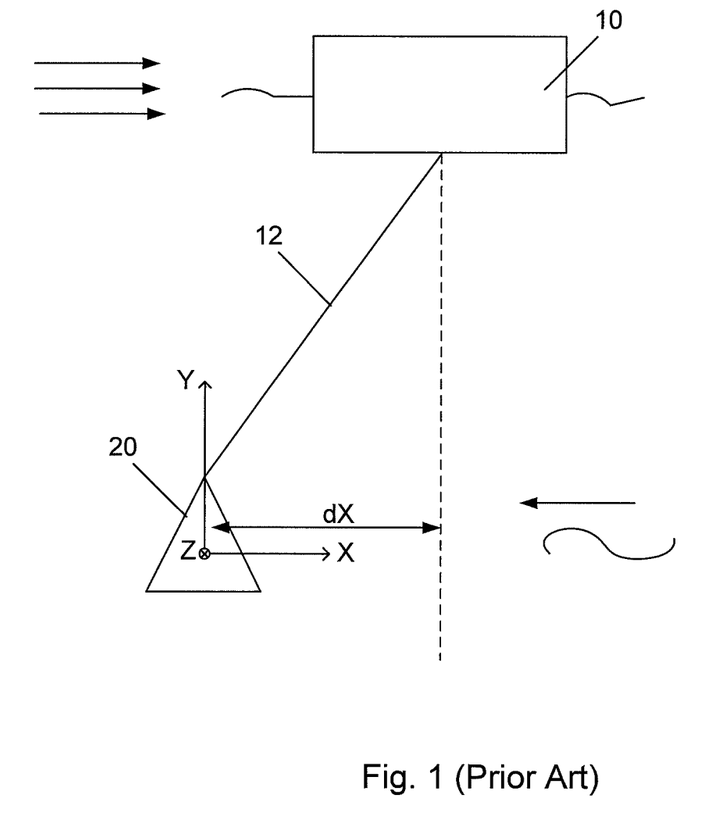
FIG. 1 shows deviation of a towed surface vessel due to underwater current and surface waves which result in relative position error in X- and Y-direction in the prior art.

Reference is now made to FIG. 1 which shows a considerable weakness of existing solutions where a surface vessel 10 provided with a global positioning system is arranged to control devices 20 for instrumented cables (not shown) via a wire, rope or similar 12, where the towing direction is in Z-direction (indicated by a circle with cross in) and which extends in a direction being perpendicular to a plane formed by X- and Y-direction, i.e. into the page. This solution typically results in a considerable position deviation, both in X- and Y-direction, between the surface vessel 10 and control device 20 as a consequence of current conditions and drag in wire, rope or similar 12 being used. FIG. 1 illustrates position deviation as reference character dX as a consequence of this.

Figure 2A:
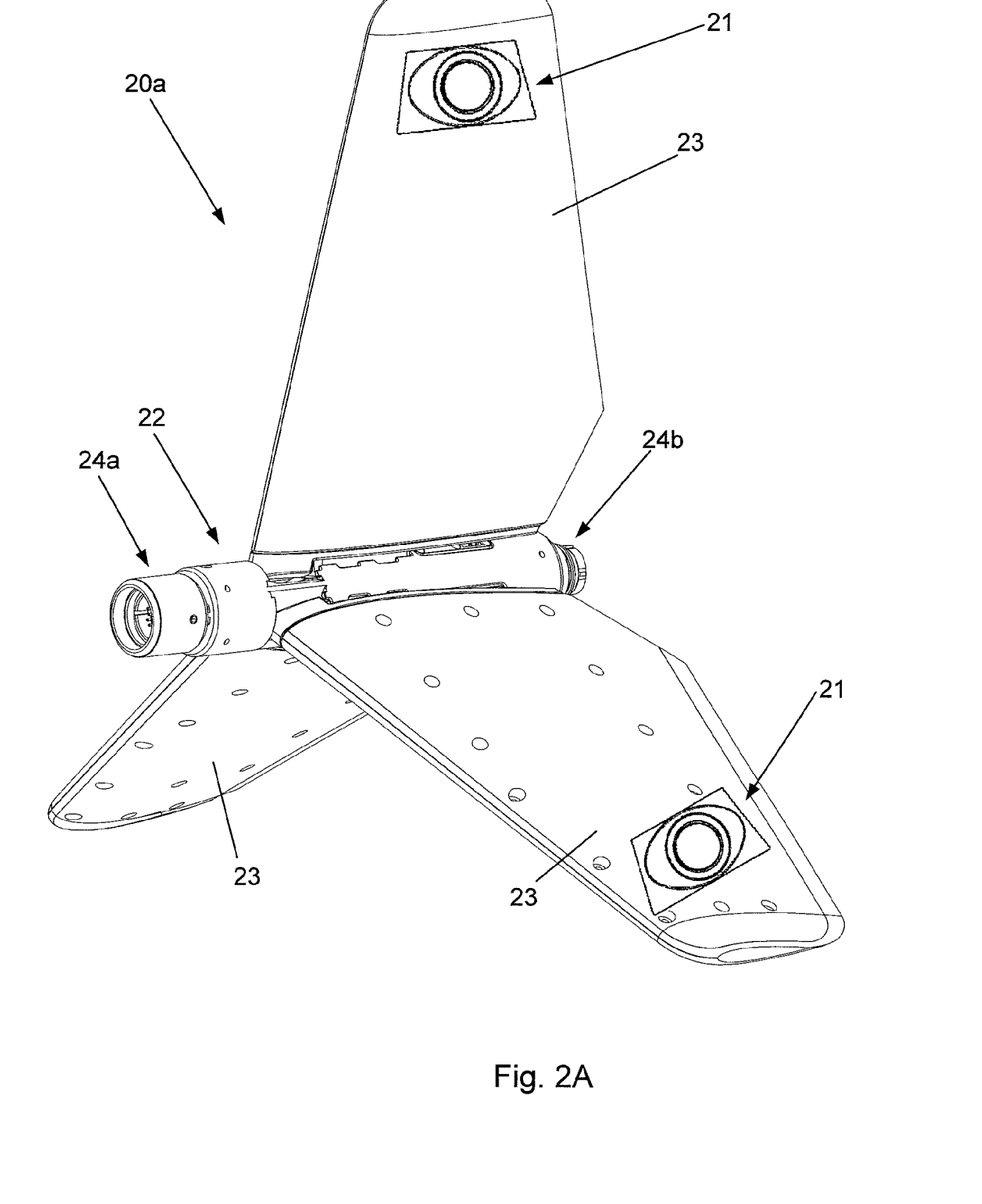
FIGS. 2A and 2B show a control devices for instrumented cables provided with an acoustic element according to the disclosure.
Figure 2B:
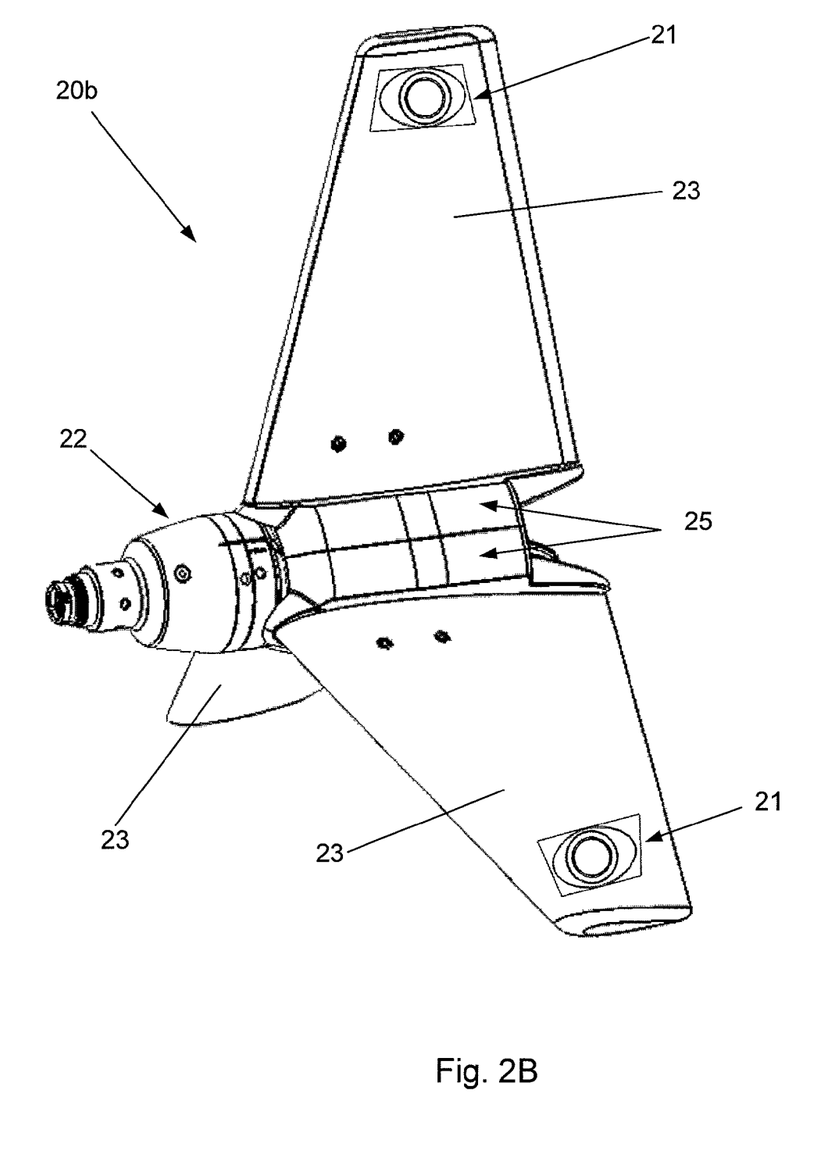

Reference is now made to FIGS. 2A-2B showing principle drawings of control devices 20a-b for instrumented cables provided with an acoustic element 21, known from NO 332115 in the name of the applicant, which entire publication is incorporated herein.

Control devices 20a-b are arranged for connection in series between to adjoining instrumented cable sections of a multi-section cable, for controlling the instrumented cable.

FIG. 2A shows a first embodiment where the control device 20a is formed by a main body 22 and three similar wings 23, so-called smartwings, which are evenly distributed around the main body 22, and is a so-called three-axis bird. The main body 22 is mainly an elongated streamlined tubular housing, which at its ends includes connectors 24a and 24b adapted for mechanical and electrical connection in series in a multi-section seismic instrumented cable, of the type being towed behind a survey vessel. The connectors 24a-b are for this adapted corresponding connection points (not shown) in each end of a cable section, which connection points usually are used for connecting two adjoining cable sections. The wings 23 are further detachably arranged to the main body 22.

The main body 22 is further provided with a processor unit, accelerometers, possibly rate gyro and magnet compass, pressure sensor, and three inductive connections for wireless communication and transfer of energy to wings or three mechanical connections for communication and energy transfer.

The wings 23 are provided with a processor unit, inductive connection or mechanical connection for connection to the main body 22 for communication and energy transfer, Hall effect sensor, chargeable buffer batteries, intelligent charging electronics, and motor with moment sensor.

Each wing 23 is further provided with an acoustic element 21 in the form of a sender/receiver element, in the form of a transducer, and can be provided with electronics for acoustic range measurement.

FIG. 2B shows a second control device 20b formed by a main body 22 provided with detachable motor and drive gear housings 25 arranged for connection to the energy line and current line of the instrumented cable by connections in the main body 22. Instead of energy supply (buffer batteries), processor unit, motor with moment sensor, intelligent charging electronics, and Hall effect sensor are arranged in the wing 23 as above, these are integrated in the motor and drive gear housings 25. Also in this embodiment at least one of the wings 23 is provided with acoustic element 21 in the form of a sender/receiver element, in the form of a transducer, and can be provided with electronics for acoustic range measurement.

The inventive embodiments are accordingly based on control devices 20a,b being provided with the acoustic element 21 in at least one of the wings 23.

Figure 3:
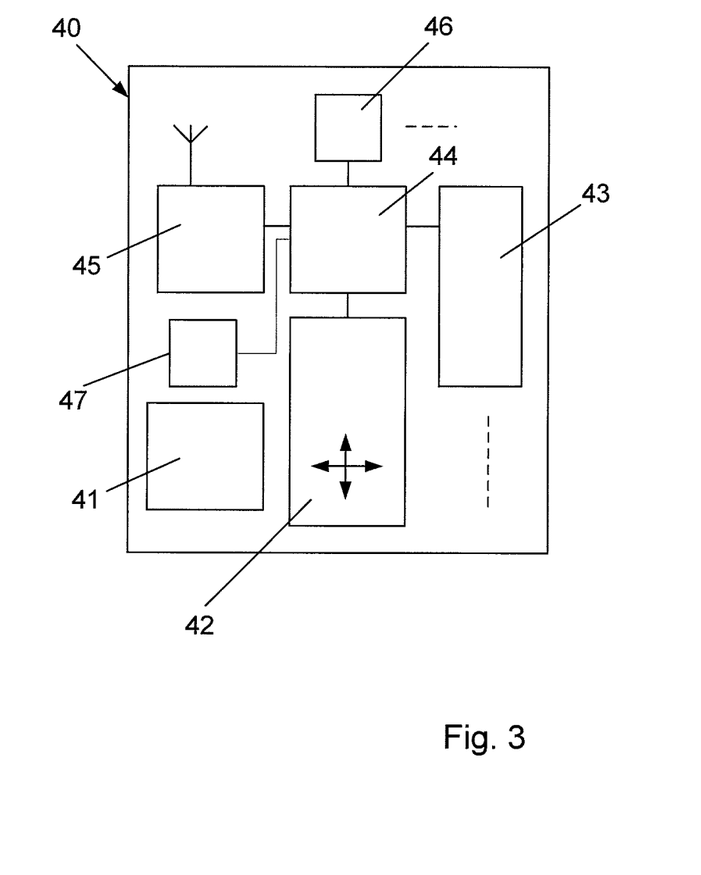
FIG. 3 is a principle drawing of an autonomous surface vessel according to the disclosure.

Reference is now made to FIG. 3 which shows a principle drawing of an autonomous surface vessel 40 according to the disclosure. The autonomous surface vessel 40 includes energy supply 41, motors 42 for powering propulsion means, such as thrusters or propellers (not shown), for propulsion in X- and Y-direction, acoustic communication means 43 for communication with control devices 20a-b provided with an acoustic element 21, control unit 44 with memory and interface for steering and controlling the autonomous surface vessel 40, radio communicator 45 for communication with survey vessel, work boats or other surface units, and optical communicator 46 for communication with other surface units.

The autonomous surface vessel 40 is further provided with a global positioning system 47 for self-positioning.

Figure 4:
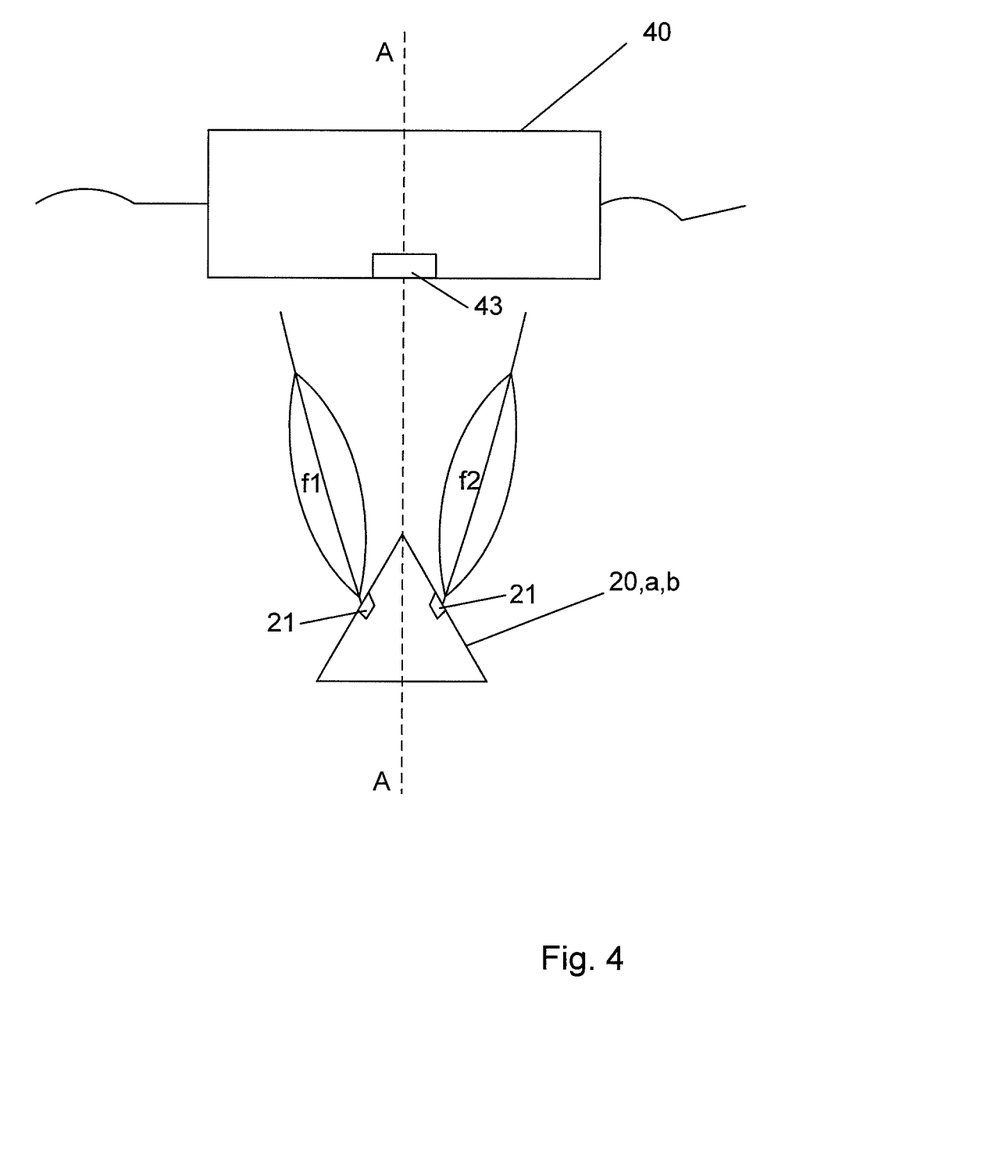
FIG. 4 is a principle drawing of the disclosed embodiments in use.

Reference is now made to FIG. 4 which shows how the surface vessel 40 and control device 20a,b can communicate and position according to the disclosed method, and how accurate position for the control device 20a,b can be determined.

In the disclosed embodiments, the surface vessel 40 can navigate to approximate position above the control device 20a,b based on control commands from the survey vessel. When the surface vessel 40 is positioned in the vicinity of the control device 20a,b, the acoustic element 21 in the control device 20a,b and the communication means 43 of the surface vessel 40 are used to position the surface vessel 40 in accurate position above the control device 20a,b so that the deviation in X- and Y-direction becomes approximately zero. This is achieved by that the control device 20a,b is provided with two or more acoustic elements 21 oriented in different direction so that the transmitter lobe from the two or more acoustic elements 21 forms known angles with each other. FIG. 4 shows how two acoustic elements 21 in the control device 20a,b transmit in each their direction towards the surface where the surface vessel 40 is located. The acoustic communication means 43 of the surface vessel 40 are arranged to receive and decode the signals from the control device 20a,b so that information from the at least two acoustic elements 21 can be used for accurate positioning directly above the control device 20a,b.

By modulating the signals of the acoustic elements 21 with different modulating frequencies f1 and f2, respectively, the surface vessel 40 can detect the mutual relative strength between the two modulating frequencies f1 and f2 and utilize this to determine accurate position straight above the control device 20a,b. The surface vessel 40 will accordingly detect a more powerful signal on the frequency f1 if it is displaced to the left of the center line A-A through the control device 20a,b and too powerful signal on the frequency f2 if it is positioned to the right of the center line A-A. If the signals on both frequencies are equally powerful the surface vessel 40 is positioned accurately on the center line A-A and thus directly above the control device 20a,b.

A modification of this embodiment is by that the control device 20a,b is provided with a third acoustic communication means (not shown) with the modulating frequency f3 in a direction being perpendicular to f1 and f2, then the same method can be used both in X- and Y-direction and thus position the surface vessel 40 directly above the control device 20a,b, and the position can thus be determined by the global positioning system of the surface vessel 40.

If the surface vessel 40 detects a difference in the signal strength in the three frequencies f1, f2 and f3, an estimate for position deviation can be calculated and a control signal be generated which controls the propulsion means of the surface vessel 40 so that the surface vessel 40 moves in X- and/or Y-direction so that the deviation is minimized. A deviation in position due to changed current conditions will now momentarily be compensated by the surface vessel 40 by that the propulsion means controls the surface vessel 40 after the movements of the control device 20a,b.

The positions of the control device 20a,b and surface vessel 40 can be reported directly to the survey vessel via the radio communicator 45 of the surface vessel. Another method is by sending position information from the surface vessel 40 via the acoustic communication means 43 to the acoustic element 21 in the control device 20a,b and then via the data line in the instrumented cable. The redundancy introduced by that one have both data communication via instrumented cable and radio considerably increases the safety and reliability of the seismic operation.

To achieve maximal accuracy in the positioning differential methods can be used for correcting the GPS signal. Based on the high accurate GPS navigation receiver of the seismic survey vessel and reports from the surface vessel 40, differential correction signals can be derived which can be used in the further processing of the navigation signals. External correction signals from satellite-based system can correspondingly be introduced to increase the accuracy further.

In an alternative embodiment the surface vessel 40 is provided with several acoustic communication means 43 so that the modulated acoustic signals are generated from the surface vessel 40 and received by corresponding acoustic elements 21 of the control device 20a,b, and transfer of control information for the surface vessel 40 can be sent via the acoustic link between the surface vessel 40 and control device 20a,b or sent to the survey vessel via a data line in the instrumented cable and then to the surface vessel 40 via radio communication.

The surface vessel 40 can advantageously be provided with optical communicator 46 in the form of light sources which can be controlled from the control unit 44. These can operate according to instructions from the control unit 44, controlled via the mentioned communication channels or autonomously in relation to the illumination in the environments. The surface vessel 40 can further be provided with photo sensitive receivers so that an optical communication channel can be established in addition to the other communication channels. This will further increase the reliability and safety for error-free communication.

In connection with operation and maintenance of the seismic instrumented cable spread are often used work boats with personnel retrieving separate control devices 20a,b while the spread is in operation. Maintenance personnel can via the surface vessel 40 rapidly identify the position of the underlying control device 20a,b and command this to the surface for service and repair while the spread is in operation. Communication can be performed directly via de acoustic elements 21 or acoustic communication means 43 or communication via the survey vessel and the instrumented cable.

The present invention can in the principle be used for positioning all control devices 20a,b along the spread by that work boats or the survey vessel commands the surface vessel to move to the next control device 20a,b after accurate position is determined for the control device 20a,b of interest. A typical operation can then be that the surface vessel 40 moves from the last control device on an instrumented cable and forward on the instrumented cable until it finds the next control device 20a,b. By that the position of each separate control device 20a,b is known with rough accuracy at the survey vessel the surface vessel 40 can be commanded to go to approximate given position and start searching for the control device 20a,b of interest by measuring the modulated signals from this, or as mentioned above, by that the surface vessel 40 sends out modulated signals which the control device 20a,b measures.

In an alternative embodiment is each separate control device 20a,b provided with their own modulating frequencies so that the surface vessel 40 also easily can identify which control device 20a,b it is in contact with.

An additional advantage of the disclosed system is that as the communication means and elements are arranged in detachable wings of the control device this makes it easy to exchange them if an error arises.

The above-described method can naturally include the use of several autonomous vessels.

By using several surface vessels anti-collision means may be utilized. By using several autonomous surface vessel these can be formation controlled to cover different parts of the spread.

By using several surface vessels these can also be formation controlled over the spread to cover different parts of the spread more effectively.

The method can further include controlling the autonomous surface vessel after a pre-programmed route or to a given position for positioning numerous control devices.

The invention claimed is:

1. A method for high-accurate position determination of a control devices (20a,b) in connection with instrumented cables being towed behind a survey vessel via at least one surface vessel (40) provided with two or more acoustic communication means (43) that form known angles with each other, where the control devices (20a,b) are provided with acoustic elements (21), comprising the steps of:
   positioning at least one surface vessel (40) in the vicinity of a chosen control device (20a,b) arranged in connection with an instrumented cable via control commands from the survey vessel,
   transmitting directive modulated acoustic signals from one or both of the acoustic elements (21) in the control device (20a,b) and the two or more acoustic communication means (43) of the surface vessel(s) (40), and the directive modulated acoustic signals are transmitted with at least two different frequencies (f1, f2) in two different directions, and
   using the two or more acoustic communication means (43) in the surface vessel (40), the acoustic elements in the control device (20a,b), and the relative strength between the measured directive modulated signals to position the surface vessel (40) accurately above the chosen control device (20a,b).

2. The method of claim 1, comprising transmitting directive modulated signals from the two or more acoustic communication means (43) of the surface vessel(s) (40).

3. The method of claim 1, comprising transmitting a third modulated acoustic signal with a third frequency (f3), wherein the third modulated acoustic signal is arranged perpendicular to the acoustic signals (f1) and (f2).

4. The method of claim 1, comprising the step of measuring mutual relative strength between the directive modulated acoustic signals with different frequencies (f1, f2, f3).

5. The method of claim 1, comprising estimating position deviation between the control device (20a, b) and surface vessel (40) based on relative strength between the measured directive modulated acoustic signals (f1, f2, f3) and use the estimated position deviation as control signals for propulsion means of the surface vessel (40) for minimizing the position deviation.

6. The method of claim 1, comprising determining accurate position for the surface vessel (40) by via a global positioning system arranged on the surface vessel (40).

7. The method of claim 6, comprising using differential methods for correcting the signal from the global positioning system.

8. The method of claim 6, comprising using external correction signals from satellite-based system for increased accuracy at position determination of the surface vessel (40).

9. The method of claim 1, comprising distributing accurate position to survey vessels, work boats and other users of such information.

10. The method of claim 1, comprising distributing accurate position via one or more of the group of redundant communication channels consisting of radio communication, acoustic communication, instrumented cable and optical communication.

11. The method of claim 1, wherein the surface vessel (40) is autonomously controlled after a pre-programmed route or to a given position for positioning numerous control devices (20a,b).

12. A system for high-accurate position determination of control devices (20a,b) arranged in connection with instrumented cables towed behind a survey vessel via at least one autonomous surface vessel (40) provided with two or more acoustic communication means (43) that form known angles with each other, where the control devices (20a,b) are provided with acoustic elements (21), wherein the two or more acoustic communication means (43) of the surface vessel (40) and the acoustic elements (21) of the control devices (20a,b) are arranged for direct communication with each other for positioning the surface vessel (40) in accurate position over a chosen control device, the acoustic communication elements (21) are arranged to transmit directive modulated signals with different frequencies (f1, f2, f3) in different directions, and the control unit (44) is arranged for positioning the autonomous surface vessel (40) in accurate position above a control device (20*a,b*) of interest based on the relative strength between the measured directive acoustic modulated signals.

13. The system according to claim 12, wherein the control device (20*a,b*) includes one or more wings (23), and the acoustic elements (21) are arranged in at least one wing (23).

14. The system of claim 12, wherein the control device (20*a,b*) includes at least two wings (23), and the acoustic elements (21) are arranged in at least two wings (23).

15. The system of claim 12, wherein the control device (20*a,b*) includes at least three wings (23), and the acoustic elements (21) are arranged in at least three wings (23).

16. The system of claim 12, wherein the control unit (44) is arranged for estimating position deviation between control device (20*a,b*) and surface vessel (40) based on relative strength between the measured directive modulated acoustic signals (f1, f2, f3) and utilize the estimated position deviation as control signals for propulsion means of the surface vessel (40) for minimizing the position deviation.

17. The system of claim 12, wherein the control unit in the control device (20*a,b*) is arranged for estimating position deviation between control device (20*a,b*) and surface vessel (40) based on relative strength between the measured directive modulated acoustic signals (f1, f2, f3) and that the control unit (44) is arranged for utilizing the estimated position deviation as control signals for propulsion means of the surface vessel (40) for minimizing the position deviation.

18. The system of claim 12, wherein the surface vessel (40) is provided with a global positioning system for accurate positioning of the surface vessel (40).

19. The system of claim 18, wherein the control unit (44) is arranged for utilizing differential methods for correcting the signal from the global positioning system (47).

20. The system of claim 19, wherein the control unit (44) is arranged for utilizing external correction signals from satellite-based system for increased accuracy at position determination of the surface vessel (40).

21. The system of claim 12, wherein the surface vessel (40) is provided with radio communication means (46) for communication with survey vessel, work boats or other surface units.

* * * * *